INVENTOR.
JOHN W. BARNSTEAD
BY
HIS ATTORNEY

United States Patent Office 2,854,141
Patented Sept. 30, 1958

2,854,141

RECIRCULATION FILTERING SYSTEM

John W. Barnstead, Lyndon, Ky., assignor to General Electric Company, a corporation of New York Application November 14, 1955, Serial No. 546,561

4 Claims. (Cl. 210—167)

This invention relates to recirculation filtering systems, and more particularly to such a system including a strainer adapted to be automatically cleaned during operation of the system.

One of the problems encountered in recirculating liquid type cleaning systems involves the redeposition of soil particles previously removed from the articles being washed. While conventional filtering screens may be utilized to separate solid particles from the circulating liquid, such screens invariably require periodic cleaning for continued efficiency. Even screens of the so-called "reverse flushing" type have not proved to be entirely satisfactory because stringy material, for example, may pass through the screen and become so entangled in the wire mesh of the screen that it may be removed only by the use of very high pressure water or hand scrubbing.

Accordingly, a principal object of the present invention is to provide a filtering system including filtering means adapted to be periodically and automatically cleaned so that material adhering thereto may be removed and flushed away.

Another object of this invention is to provide a liquid recirculating filter system in which the filtering means is so arranged associated with a drainage pump that the filtering means is automatically cleaned upon drainage of the system.

Another object of this invention is to provide a filtering system for dishwashers or the like in which a strainer which may be cleaned by centrifugal force is associated with the drain pump of the dishwasher so that operation of the pump automatically cleans the strainer.

Still another object of this invention is to provide a strainer having movable fingers forming a strainer surface so arranged that centrifugal force may be utilized to move the fingers to a position in which accumulated material adhering thereto is removed by the same force.

Further objects and advantages of my invention will become apparent as the following description proceeds, and the features of novelty which characterize the invention will be pointed out with particularity in the claims annexed to and forming a part of this specification.

Briefly stated, in accordance with one form of my invention, the foregoing objectives are achieved by providing a recirculating liquid system including a main compartment and a drain pump located in a sump at the bottom of the compartment, and a rotatable strainer located in the recirculating system and adapted to be rotated upon rotation of the drain pump. The strainer includes wall elements defining an opening displaced from its axis of rotation, and finger elements overlying the opening secured at one end so as to form a strainer surface but movable away from the axis of rotation under the influence of centrifugal force.

For a better understanding of this invention reference may be made to the accompanying drawing in which.

Figure 1:
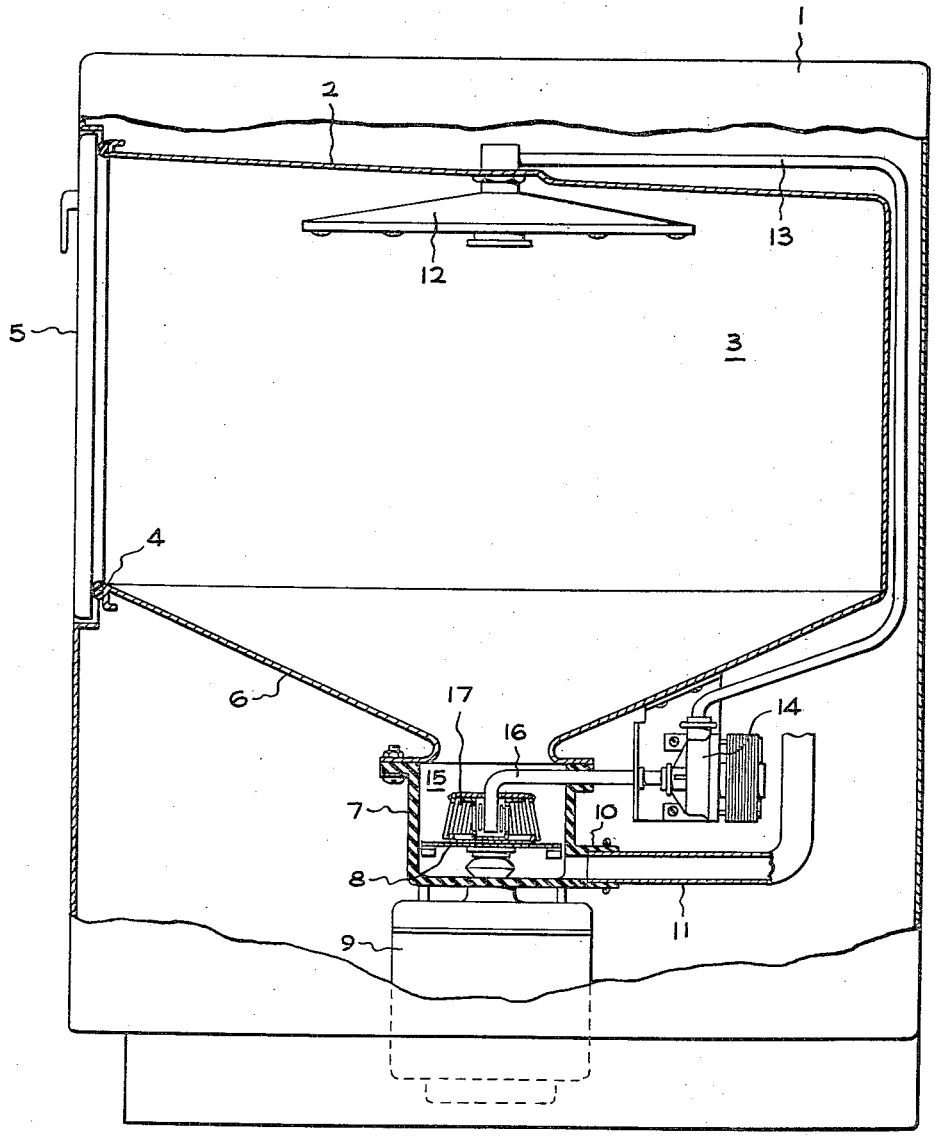
Fig. 1 is an elevation partly in section of a dishwasher embodying my invention.

Referring to the drawing, this invention has been shown in one form as applied to a front opening dishwasher having an enclosing cabinet structure 1 of rectangular box-like form within which is mounted a tub 2 forming a main or washing compartment 3. Tub 2 is provided with a front opening 4 which is closed by a door 5 suitably mounted on cabinet structure 1. At the bottom of compartment 3, tub 2 is provided with downwardly sloping walls 6 forming a sump, and at the bottom of sump 6 is mounted a drain pump 7 having a rotary impeller 8 driven by an electric motor 9 mounted below the pump housing. The outlet 10 of drain pump 7 is connected to a drain line 11 which extends upwardly within cabinet 1 to a conventional drain gap (not shown). Tub 2 is also provided with a suitable water inlet (not shown) whereby water may be admitted to washing compartment 3 at the beginning of each washing operation. Main compartment 3 may, of course, be provided with suitable racks (not shown) for supporting dishes or the like or any other suitable means for supporting articles therein for washing or other liquid treating operations.

Liquid is circulated within compartment 3 by means of a rotary spray head 12, for example, mounted below the top wall of tub 2 and connected by means of a pipe 13 to the outlet of recirculating pump 14. The inlet of pump 14 is connected to the sump chamber 15 at the bottom of compartment 3 by means of a conduit 16, and consequently during operation of pump 14 liquid is continuously withdrawn from the lower portion of compartment 3 and pumped to spray-head 12 which delivers a rotating liquid spray to the interior of the washing compartment.

Figure 2:
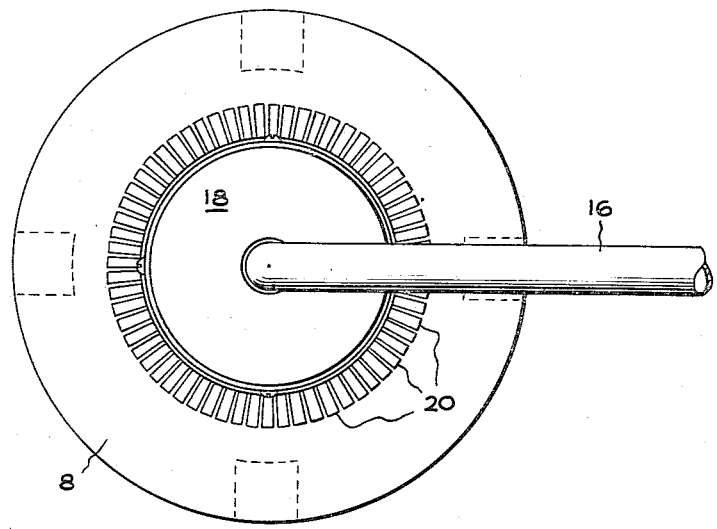
Fig. 2 is a plan view of the pump and strainer assembly forming a part of the dishwasher shown in Fig. 1.
Figure 3:
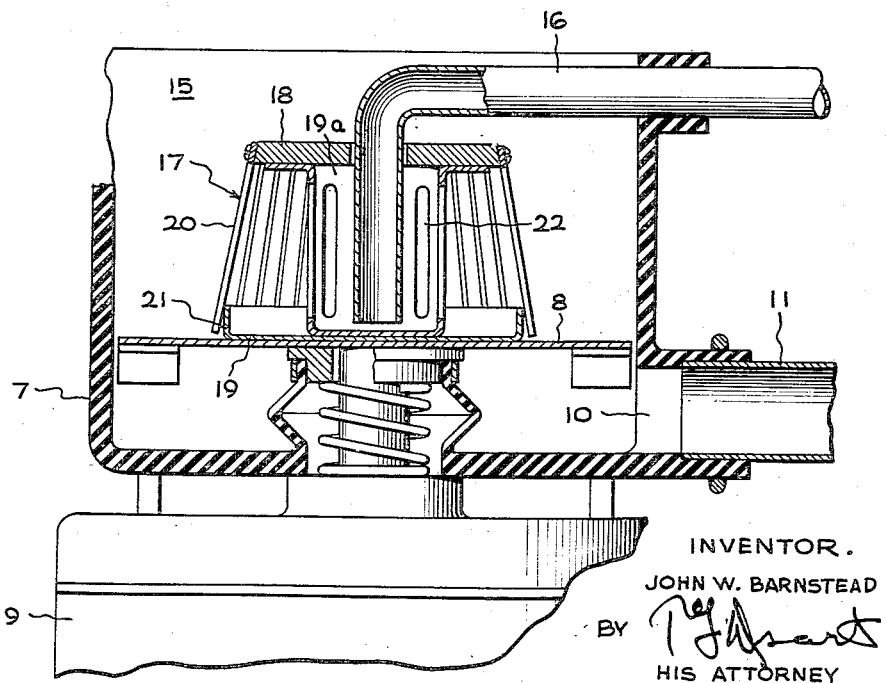
Fig. 3 is an enlarged fragmentary view of the strainer and drain pump assembly forming a part of the dishwasher shown in Fig. 1.

One of the problems encountered in recirculating liquid type washing apparatus involves the recirculation of soil particles which have been removed from the articles being washed, and which may be redeposited upon the articles unless suitable means are provided for removing the soil from the recirculating liquid. To perform this function, the filtering system of the present invention includes a strainer designated by the numeral 17 located in sump chamber 15 and adapted to filter recirculating liquid before it enters conduit 16. Referring to Figs. 2 and 3 in particular, strainer 17 includes spaced top and bottom walls 18 and 19 secured in spaced generally parallel relationship by a supporting member such as foraminated tubular member 19a. Strainer 17 is mounted for rotation on drain pump impeller 8; preferably bottom wall 19 is suitably secured, by spot welding, for example, to impeller 8 so that the strainer and impeller form an integral rotating unit. It will be observed that discharge conduit 16 extends through a central opening in top wall 18 and within tube 19 so that liquid is withdrawn from the strainer chamber during operation of pump 14.

The strainer surface of this assembly is formed by a plurality of generally parallel spaced finger elements 20 overlying the opening defined by the peripheral edges of top wall 18 and upturned flange 21 on bottom wall 19. Fingers 20 are secured to the periphery of top wall 18 and extend downwardly into engagement with the outer peripheral edge of flange 21 on bottom wall 19, so that in their normal position the fingers form a generally cylindrical straining surface. Hence during washing operations water collected in sump chamber 15 is filtered through this strainer surface before passing through openings 22 in tubular member 19a and finally into conduit 16. Consequently, soil particles and other materials removed from the articles being washed in chamber 3 accumulate on fingers 20 and are prevented from passing back into the washing compartment.

Such accumulater soil particles and material must be periodically removed from the strainer, and in accordance with the present invention this may be easily and automatically accomplished each time drain pump 7 is operated. This is achieved by making fingers 20 outwardly movable upon rotation of impeller 8 so that the lower ends of the fingers are moved outwardly from bottom wall 19; thus any material adhering thereto, including any particles wedged between adjacent fingers, is removed by centrifugal force and is discharged through the drain line of the pump chamber. In the illustrated embodiment, fingers 20 are made of flexible material and are fixedly secured at their upper ends to the periphery of top wall 18; however, other means for mounting the fingers so that they move outwardly upon rotation of the strainer chamber, may be utilized.

From the foregoing description it will be evident that I have provided an improved filtering system in which a novel self-cleaning strainer is associated with a drain pump so that the strainer performs its assigned function during recirculation of liquid in the system, and upon operation of the drain pump at the completion of the recirculation cycle accumulated soil particles and the like are automatically removed from the strainer surface and flushed through the drain outlet.

While I have described and shown a specific embodiment of my invention, I do not desire my invention to be limited to the particular construction shown and described, and I intend by the appended claims to cover all modifications within the true scope and spirit of my invention.

What I claim is:

1. A recirculation filtering system comprising a main compartment, a sump at the bottom of said compartment and a drainage pump including a rotary impeller at the bottom of said sump, a rotatable chamber mounted on said impeller, said chamber including wall elements defining an inlet opening displaced from the axis of rotation of said chamber and an outlet opening generally concentric with said axis, a plurality of finger elements overlying said inlet opening, each of said finger elements being secured at one end thereof to one of said wall elements, the other ends of said finger elements being movable outwardly from said wall elements upon rotation of said chamber, a discharge conduit extending through said outlet opening and communicating with the interior of said chamber, a recirculating pump connected to said discharge conduit and to said main compartment so as to discharge filtered liquid into said compartment, and a motor for rotating said pump impeller and said chamber.

2. A recirculation filtering system comprising a main compartment, a sump at the bottom of said compartment and a centrifugal pump including a rotary impeller at the bottom of said sump, a rotatable chamber mounted on said impeller, said chamber including a bottom wall secured to said impeller, a top wall mounted above said bottom wall, a plurality of generally parallel flexible fingers secured to the periphery of said top wall and extending downwardly into engagement with the periphery of said bottom wall, said fingers being spaced so as to form a strainer surface, a discharge conduit extending through one of said walls and communicating with the interior of said chamber, a recirculating pump connected to said discharge conduit and to said main compartment so as to discharge filtered liquid into said compartment, and a motor for rotating said pump impeller and said chamber whereby said fingers are flexed outwardly by centrifugal force during operation of said centrifugal pump so as to remove accumulated material adhering to said strainer surface.

3. A recirculation filtering system comprising a washing compartment, a sump at the bottom of said compartment and a centrifugal pump including a rotary impeller at the bottom of said sump, a rotatable chamber mounted on said impeller, said chamber including a circular bottom wall having an upwardly extending peripheral flange generally concentric with the axis of rotation of said impeller, a foraminated tubular member secured to said bottom wall concentric with said axis and extending upwardly therefrom, a circular top wall parallel to said bottom wall secured to the upper end of said tubular member with its center aligned with said axis, a discharge conduit extending through a central opening in said top wall and within said tubular member terminating in an open end spaced above said bottom wall, a plurality of generally parallel flexible fingers secured to the periphery of said top wall and extending downwardly into contact with the outer edge of said flange, said fingers being evenly spaced so as to form a strainer surface, and a motor for rotating said pump impeller and said chamber whereby said fingers are flexed outwardly by centrifugal force so as to remove accumulated material adhering thereto upon rotation of said pump impeller.

4. A strainer comprising a circular bottom wall having an upwardly extending peripheral flange, a foraminated tubular member secured to said bottom wall and extending upwardly with its axis in alignment with the center of said bottom wall, a circular top wall parallel to said bottom wall secured to the upper end of said tubular member with its center aligned with said axis, a discharge conduit extending through a central opening in said top wall concentric with said tubular member and terminating in an open end spaced above said bottom wall, a plurality of generally parallel flexible fingers secured to the periphery of said top wall and extending downwardly into contact with the outer edge of said flange, said fingers being evenly spaced so as to form a strainer surface, and means for rotating said walls about said axis whereby said fingers may be flexed outwardly by centrifugal force so as to remove accumulated material adhering thereto.

References Cited in the file of this patent

UNITED STATES PATENTS

| | | |
|---|---|---|
| 1,637,376 | Gibney | Aug. 2, 1927 |
| 2,054,797 | Franklin | Sept. 22, 1936 |
| 2,629,390 | Walker | Feb. 24, 1953 |

FOREIGN PATENTS

| | | |
|---|---|---|
| 414,318 | France | June 16, 1910 |
| 490,061 | France | Nov. 25, 1918 |